Patented Oct. 6, 1925.

1,556,572

UNITED STATES PATENT OFFICE.

WINFIELD SCOTT PIERCE, OF OAKLAND, CALIFORNIA.

PROCESS OF PREPARING FRUIT JUICE.

No Drawing.   Application filed July 24, 1924.   Serial No. 728,036.

Be it known that I, WINFIELD SCOTT PIERCE, a citizen of the United States, and a resident of Oakland, in the county of Alameda and State of California, have invented certain new and useful Improvements in Processes of Preparing Fruit Juice, of which the following is a specification.

This invention relates to prepared fruit juice, and has for its object to provide a process whereby fruit juice, mixed with other ingredients as will hereinafter appear, may be prepared so that the whole will be in an approximately dry condition.

Another object is to provide a process whereby the natural oil of the fruit may be incorporated with sugar and subsequently with fruit juice and fruit pulp and the whole treated in such a manner as to be rendered approximately dry and without loss of the natural volatile flavoring matter of the oil and the juice, and without loss of the coloring matter.

A further object is to provide a process whereby the resultant product will be in granular form and readily soluble in cold water, without the necessity of grinding or comminuting the same.

A still further object is to provide a process whereby the true fruit juice may be combined with the essential oil and the pulp of the fruit in a manner whereby the fruit juice flavor and aroma are enhanced by the essential oil.

Heretofore, products of this type have been open to the serious objections that a large percentage of the aromatic esters was lost during the preparation of the product, and that the product was a hard, cakey mass, difficultly soluble in cold water.

These objectionable features are overcome by my process, which is applicable to any kind of fruit.

For the purpose of illustration, the preparation of orange juice will be described.

The juice and a portion of the pulp of the orange are evaporated in an evaporating pan in vacuo to a syrupy consistency. It is important that no essential oil be present. The essential oil of the orange peel is now intimately and uniformly incorporated with cane sugar, approximately one pound of sugar being used to each pound of the raw juice-pulp mixture. The oil is readily absorbed by the sugar.

The partially evaporated, syrupy juice-pulp mixture is now gradually added to the oil-impregnated sugar, the latter being stirred constantly and the whole being thoroughly and intimately mixed. This results in the absorption of the concentrated juice-pulp mixture by the oil-impregnated sugar, and the formation of a film or coating of the juice-pulp mixture on the outer surface of the individual granules of sugar. This film, together with the sugar granule itself, effectively prevents the escape of the volatile aromatic essential oil which has already been absorbed by and is retained in, the sugar granule, during subsequent dehydration.

The whole is now placed in a vacuum dehydrating chamber and a vacuum of 29 inches of mercury and a temperature of 100 degrees, F. is maintained for a period of 1 hour. At the end of this time, the vacuum is broken and the product thoroughly stirred. Stirring is an essential step, as it prevents the fruit juice mass from caking. The chamber is again sealed and a vacuum of 29 inches at approximately 100 degrees, F. (not exceeding 110 degrees, F.) is again maintained for 1 hour, at the end of which time the product is stirred as before. After stirring thoroughly, the chamber is sealed again and the same vacuum and temperature maintained for a period of 30 minutes, at which time the end point is reached, the product is removed from the vacuum chamber, and the process is completed.

The product when dissolved in water, is ready to drink.

This process of preparing fruit juice produces a product which is rich in pulp and essential oil, a product which is readily soluble in cold water, which has lost practically nothing in either flavor or aroma, which will keep indefinitely in pasteboard containers at ordinary temperature and which affords an exceedingly simple and easy method of producing a fruit juice drink by simply dissolving the prepared juice in water.

It will be understood that the method of preparing orange juice described is merely descriptive and not limitative, that the process is applicable to the preparation of any fruit juice, or to any selective combination of fruit juices, and that minor modifications of the process may be made, without departing from the spirit and scope of the invention as revealed and claimed.

Having now described my invention, what I claim as new and useful and desire to secure by Letters Patent is:

1. The process of preparing fruit juice comprising evaporating fruit juice and fruit pulp together in vacuo to a syrupy consistency, impregnating sugar with the essential oil of the fruit, incorporating the oil impregnated sugar with such partially evaporated juice and pulp and dehydrating the whole in vacuo to a practically dry state, thus preserving the aromatic principles and the coloring matter of the juice and oil.

2. The process of preparing fruit juice comprising evaporating fruit juice and fruit pulp together in vacuo to a syrupy consistency, impregnating sugar with the essential oil of the fruit, forming a moisture retarding film on each of such sugar granules by coating the same with said partially evaporated juice-pulp mixture by intimately mixing the same therewith and dehydrating the whole to a state of approximate dryness in vacuo, thus preventing the escape of the aromatic esters of the essential oil.

3. The process of preparing fruit juice comprising evaporating fruit juice and fruit pulp together in vacuo to a syrupy consistency, impregnating sugar with the essential oil of the fruit, incorporating the oil-impregnated sugar with such partially evaporated juice and pulp, partially dehydrating the whole together in vacuo, breaking the vacuum, stirring the whole, and then continuing the dehydration of the same in vacuo to a practically dry state, thus preventing the caking of the mass and preserving in the same the natural flavoring and coloring principles of the juice and oil, and rendering the whole readily soluble in cold water.

In testimony whereof, I have signed my name to this specification.

WINFIELD SCOTT PIERCE.